US011809247B2

(12) United States Patent
Wu

(10) Patent No.: US 11,809,247 B2
(45) Date of Patent: Nov. 7, 2023

(54) ELECTRONIC DEVICE WITH CONNECTOR SUPPORTING MULTIPLE CONNECTION STANDARDS AND SIGNAL SWITCHING METHOD AND POWER SUPPLY METHOD THEREOF

(71) Applicant: GETAC TECHNOLOGY CORPORATION, New Taipei (TW)

(72) Inventor: Ming-Zong Wu, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 14 days.

(21) Appl. No.: 17/524,680

(22) Filed: Nov. 11, 2021

(65) Prior Publication Data

US 2023/0148246 A1     May 11, 2023

(51) Int. Cl.
*G06F 1/26* (2006.01)
*G06F 13/40* (2006.01)

(52) U.S. Cl.
CPC ............ *G06F 1/26* (2013.01); *G06F 13/4022* (2013.01); *G06F 13/4081* (2013.01)

(58) Field of Classification Search
CPC .... G06F 1/26; G06F 13/4022; G06F 13/4081; G06F 13/4072; G06F 13/4282; G06F 13/385; G06F 1/3218; G06F 1/3265; G09G 2370/12; G09G 5/006; G09G 2320/08; G09G 5/003; H04L 45/52; H04L 49/10; H04L 49/1576; H04L 49/35; H04N 21/43635; Y02D 10/00
USPC .................... 345/503; 348/441; 710/104, 106
See application file for complete search history.

(56) References Cited

U.S. PATENT DOCUMENTS

| | | | |
|---|---|---|---|
| 9,064,322 B1* | 6/2015 | Wyatt | G06T 1/20 |
| 9,565,132 B2* | 2/2017 | Chandra | H04L 49/10 |
| 10,509,758 B1* | 12/2019 | Habusha | G06F 13/4022 |
| 2004/0139259 A1* | 7/2004 | Mantey | G06F 13/4031 |
| | | | 710/113 |
| 2004/0156358 A1* | 8/2004 | Nakagawa | H04L 49/103 |
| | | | 370/360 |
| 2006/0010266 A1* | 1/2006 | Liu | G06F 13/385 |
| | | | 710/62 |
| 2010/0073574 A1* | 3/2010 | Nakajima | H04N 21/437 |
| | | | 375/E7.076 |
| 2014/0307165 A1* | 10/2014 | Chiba | G09G 5/006 |
| | | | 348/441 |

(Continued)

*Primary Examiner* — Faisal M Zaman
(74) *Attorney, Agent, or Firm* — Cooper Legal Group, LLC

(57) ABSTRACT

An electronic device with a connector supporting multiple connection standards includes the connector, a first multiplexer circuit, a processor and a controller. The connector includes a detection pin and at least one signal pin. The first multiplexer circuit is coupled to the at least one signal pin. The processor is coupled to the first multiplexer circuit. The controller monitors the detection pin. The first multiplexer circuit electrically connects the at least one signal pin to the controller. Upon detecting a hot-plug signal occurring at the detection pin, the controller issues a confirmation command via the first multiplexer circuit and the at least one signal pin to request a reply of a device signal. Upon receiving the device signal, the controller controls the first multiplexer circuit according to the device signal to electrically connect the at least one signal pin to the processor or the controller.

20 Claims, 12 Drawing Sheets

(56) References Cited

U.S. PATENT DOCUMENTS

| | | | |
|---|---|---|---|
| 2015/0074300 A1* | 3/2015 | Wynn | G06F 13/4072 |
| | | | 710/104 |
| 2015/0143006 A1* | 5/2015 | Chen | G06F 13/4022 |
| | | | 710/106 |
| 2016/0044277 A1* | 2/2016 | Oh | G09G 5/02 |
| | | | 386/230 |
| 2016/0170929 A1* | 6/2016 | Pethe | G06F 13/102 |
| | | | 710/313 |
| 2016/0180491 A1* | 6/2016 | Lin | G09G 5/003 |
| | | | 345/503 |
| 2016/0366361 A1* | 12/2016 | QiaoNeng | H04N 21/47 |
| 2018/0048848 A1* | 2/2018 | Park | H04N 21/44231 |
| 2019/0064899 A1* | 2/2019 | Doi | G06F 1/266 |
| 2019/0391633 A1* | 12/2019 | Wu | G06F 1/3265 |

\* cited by examiner

ELECTRONIC DEVICE WITH CONNECTOR SUPPORTING MULTIPLE CONNECTION STANDARDS AND SIGNAL SWITCHING METHOD AND POWER SUPPLY METHOD THEREOF

BACKGROUND OF THE INVENTION

Field of the Invention

The present application relates to a signal switching technique for a connector, and more particularly, to an electronic device with a connector supporting multiple connection standards, and a switching method and a power supply method thereof.

Description of the Prior Art

Conventionally, corresponding connectors need to be individually provided for multiple connection standards in order for an electronic device to support these multiple connection standards. However, as the number of connectors necessarily provided gets larger, both the volume and the cost of the electronic device are increased.

Although an electronic device may be equipped with a DisplayPort connector with customized pins to connect to a special device, such DisplayPort connector occupies a large area in an input/output panel, and the standard High-Definition Multimedia Interface Display Data Channel (HDMI DDC) bus is given up due to pin limitations of a DisplayPort connector, such that the electronic device cannot be connected to a common device using a standard DisplayPort connector or a standard HDMI connector. As a result, applications of a system terminal user are made inflexible.

SUMMARY OF THE INVENTION

In one embodiment, the present invention provides an electronic device with a connector supporting multiple connection standards. The electronic device includes the connector, a first multiplexer circuit, a processor and a controller. The connector includes a detection pin and at least one signal pin. The first multiplexer circuit is coupled to the at least one signal pin. The processor is coupled to the first multiplexer circuit. The controller monitors the detection pin. The first multiplexer circuit electrically connects the at least one signal pin to the controller. Upon detecting a hot-plug signal occurring at the detection pin, the controller issues a confirmation command via the first multiplexer circuit and the at least one signal pin to request a reply of a device signal. Upon receiving the device signal, the controller controls the first multiplexer circuit according to the device signal to electrically connect the at least one signal pin to the processor or the controller.

In one embodiment, the present invention provides a signal switching method for a connector supporting multiple connection standards. The signal switching method includes: electrically connecting at least one signal pin of a connector to a controller; monitoring a detection pin of the connector; upon detecting a hot-plug signal occurring at the detection pin, the controller issuing a confirmation command via the first multiplexer circuit and the at least one signal pin to request a reply of a device signal; and upon receiving the device signal, electrically connecting the at least one signal pin to a first interface of a processor or the controller according to the device signal.

In one embodiment, the present invention provides a power supply method for an electronic device with a connector supporting multiple connection standards. The power supply method includes: providing a first voltage to a power pin of the connector; monitoring a detection pin of the connector; upon detecting a hot-plug signal occurring at the detection pin, issuing a confirmation command via at least one signal pin to request a reply of a device signal; when the device signal is not received, continually providing the first voltage to the power pin; and upon receiving the device signal, switching to provide a second voltage to the power pin, wherein the second voltage is higher than the first voltage.

In conclusion, in the electronic device with a connector supporting multiple connection standards and the signal switching method thereof according to the embodiments of the present invention, the confirmation command is issued via the at least one signal pin of the connector to request a reply of a device signal, and the transmission path of the at least one signal pin of the connector is switched according to whether the device signal is received, so that a single connector is enabled to support multiple connection standards. Thus, the electronic device is able to perform transmission with a common device or a special device via this single connector, and to selectively apply one from the multiple connection standards. Moreover, in the electronic device with a connector supporting multiple connection standards and the signal switching method and the power supply method thereof according to the embodiments of the present invention, the confirmation command is issued via the at least one signal pin of the connector to request a reply of a device signal, and the first voltage or the second voltage is selectively provided to the power pin according to whether the device signal is received, so that the electronic device is able to connect to a common device or a special device that uses different voltages via this single connector.

The features and advantages of the present invention described in detail in the embodiments below are sufficient for a person skilled in the art to understand and accordingly implement the technical contents of the present invention. Moreover, a person skilled in the art would be able to easily understand the objects and advantages of the present invention on the basis of the disclosure, claims and drawings of the present application.

DETAILED DESCRIPTION OF THE EMBODIMENTS

To better understand the above and other objects, features and advantages of the embodiments of the present invention, detailed description is provided with the accompanying drawings below.

Figure 1:
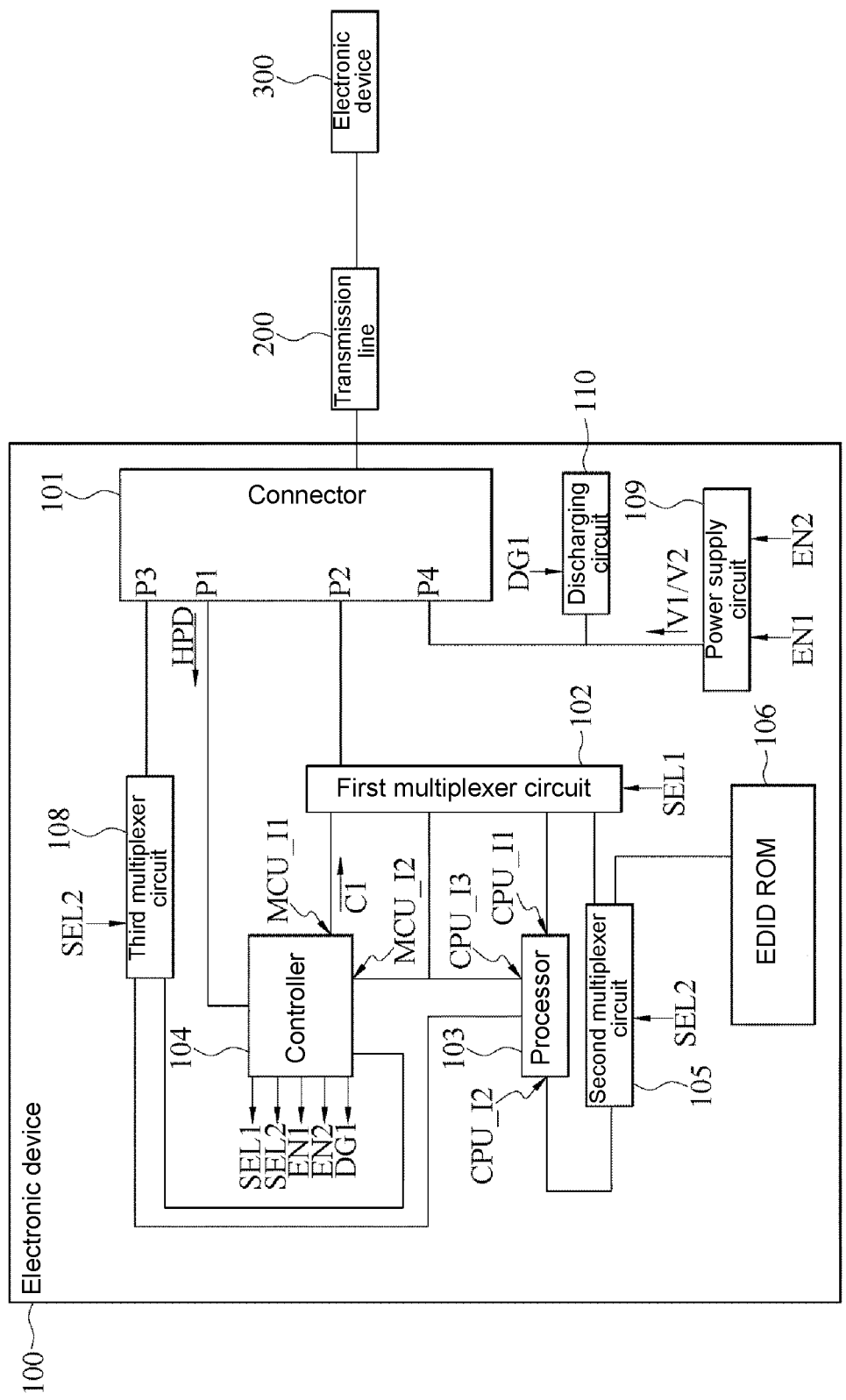
FIG. 1 is a block schematic diagram of a common device connected to an electronic device according to an embodiment of the present invention.

FIG. 1 shows a block schematic diagram of a common device connected to an electronic device according to an embodiment of the present invention. Referring to FIG. 1, an electronic device 100 with a connector supporting multiple connection standards includes a connector 101, a first multiplexer circuit 102, a processor 103 and a controller 104. The first multiplexer circuit 102 is coupled to the connector 101, the processor 103 and the controller 104.

The connector 101 is disposed at a housing of the electronic device 100, and is applicable to being connected to an external device having a corresponding connector so that the electronic device 100 is enabled to perform transmission with the external device. In some embodiments, the external device may be another electronic device having a corresponding connector, so as to be connected to or separated from the connector 101 of the electronic device 100 by means of plugging; however, the present invention is not limited to the above. In some other embodiments, the external device may be an electronic device 300. The electronic device 300 is connected to one end of a transmission line 200, and is connected to or separated from the electronic device 100 by plugging the other end of the transmission line 200 with the connector 101. In the description below, the external device is exemplified by the electronic device 300 that is connected to or separated from the electronic device 100 through the transmission line 200 for illustrations. It should be noted that this example is not to be construed as a limitation to the present invention.

The connector 101 includes a detection pin P1 and at least one signal pin P2. The first multiplexer circuit 102 is coupled among the signal pin P2 of the connector 101, the processor 103 and the controller 104, and the first multiplexer circuit 102 selectively electrically connects the signal pin P2 to the processor 103 or the controller 104. The controller 104 is coupled to the detection pin P1 of the connector 101, and the controller 104 is capable of detecting the detection pin P1 so as to determine whether the electronic device 300 is connected to the connector 101 through the transmission line 200.

In some implementation forms, the electronic device 100 may be a digital video recorder or a computer, and the electronic device 300 may be various types of screens, for example, a touch screen or a display screen. The connector 101 may be a standard High-Definition Multimedia Interface (HDMI) Type A connection port, the detection pin P1 may be pin #19 for hot-plugging detection in a standard HDMI connection port, and the signal pin P2 may be pin #15 and pin #16 for Display Data Channel (DDC) in a standard HDMI connection port. The processor 103 may be implemented by a system on chip (SoC), a central processing unit (CPU), a microprocessor, an application processor (AP), a digital signal processor (DSP), an application-specific integrated circuit (ASIC), or a combination thereof. However, the present invention is not limited to the above, and the processor 103 may be a core circuit suitable for executing various computations and operations in a system of the electronic device 100. Moreover, the controller 104 may be implemented by a micro controller unit (MCU), a keyboard controller (KBC) or an embedded controller (EC). However, the present invention is not limited thereto, and the controller 104 may be any control circuit suitable for performing a specific task.

Figure 2:
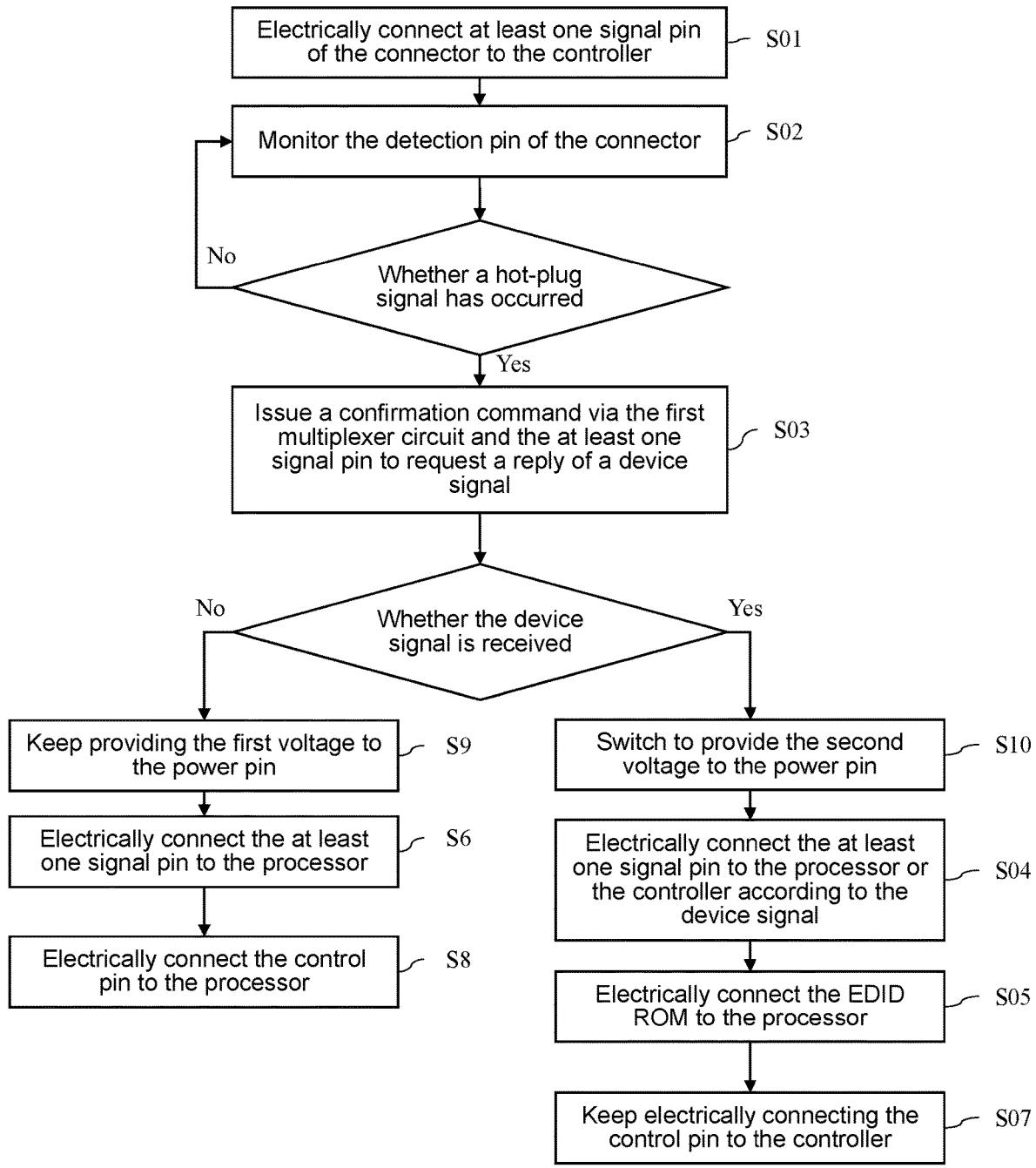
FIG. 2 is a flowchart of a signal switching method according to an embodiment.

The electronic device 100 of any embodiment of the present invention is capable of performing the signal switching method according to any embodiment. FIG. 2 shows a flowchart of a signal switching method according to an embodiment. Referring to FIG. 1 and FIG. 2, in one embodiment of the signal switching method, the first multiplexer circuit 102 of the electronic device 100 can electrically connect the at least one signal pin P2 of the connector 101 according to a selection signal SEL1 generated by the controller 104 (step S01), and the controller 104 of the electronic device 100 monitors the detection pin P1 of the connector 101 (step S02).

In step S01 according to some embodiments, the selection signal SEL1 generated by the controller 104 in a default state has a first set value, and the first multiplexer circuit 102 can normally electrically connect the signal pin P2 to the controller 104 according to the first set value of the selection signal SEL1. In some embodiments, the controller 104 includes a first interface MCU_I1, and the first multiplexer circuit 102 can normally electrically connect the signal pin P2 to the first interface MCU_I1 of the controller 104. In some implementation forms, the first interface MCU_I1 of the controller 104 may be a transmission interface adopting an Inter-Integrated Circuit (I2C) connection standard.

Upon detecting by the controller 104 a hot-plug signal HPD occurring at the detection pin P1 of the connector 101 in step S02, it means that the electronic device 300 is connected to the connector 101 through the transmission line 200. At this point in time, the controller 104 may issue a confirmation command C1 via the first interface MCU_I1 thereof, and transmit the confirmation command C1 via the first multiplexer circuit 102 and the signal pin P2, so as to request the electronic device 300 to return a device signal DEV as a reply (step S03). In some implementation forms, the confirmation command C1 may be an addressing command of the I2C connection standard.

Figure 3:
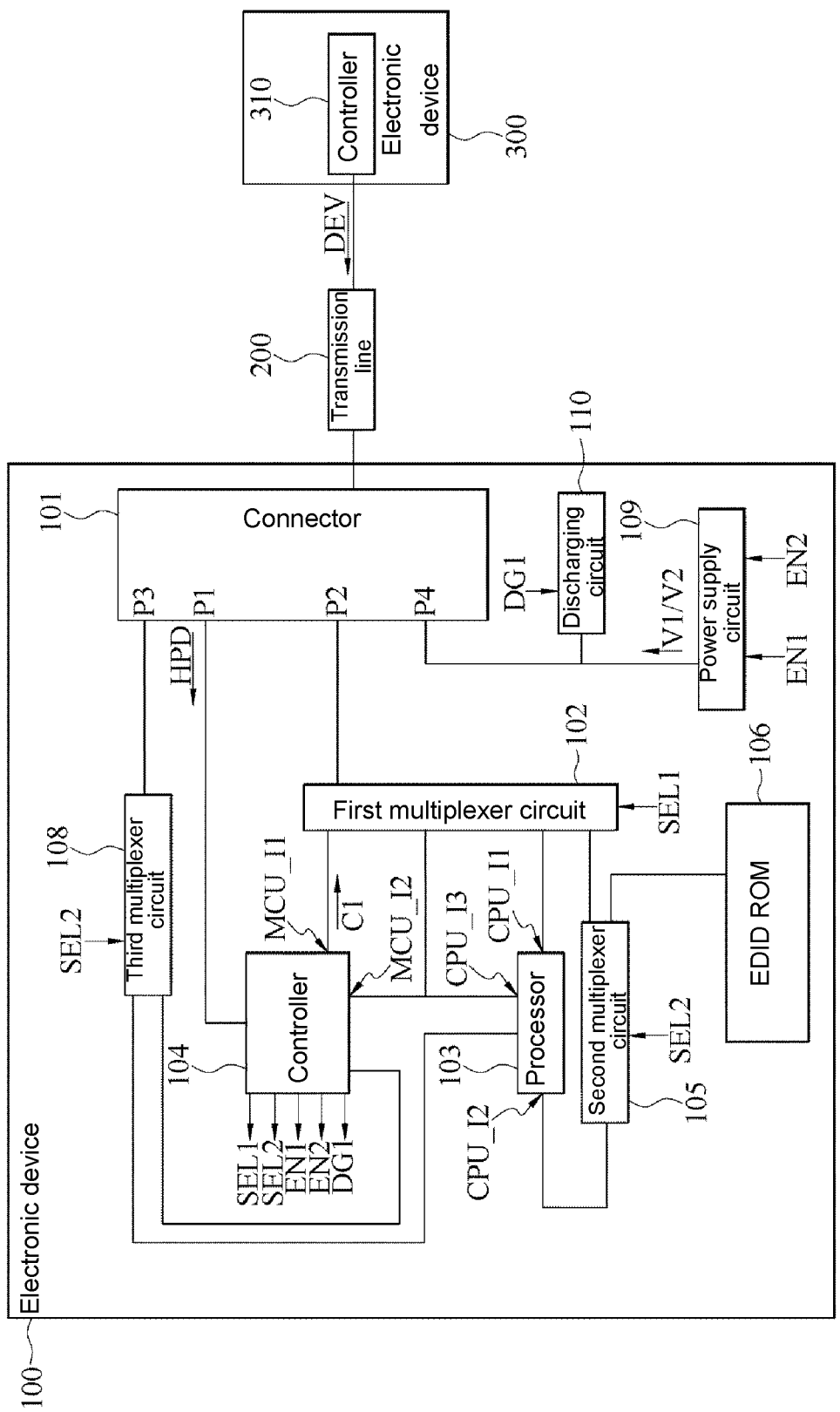
FIG. 3 is a block schematic diagram of a special device connected to an electronic device according to an embodiment of the present invention.

FIG. 3 shows a block schematic diagram of a special device connected to an electronic device according to an embodiment of the present invention. Referring to FIG. 2 and FIG. 3, in some embodiments, the electronic device 300 may be a special device having a controller 310. Thus, after receiving the conformation command C1 via the signal pin P2 of the connector 101 of the electronic device 100, the electronic device 300 may generate a device signal DEV by the controller 310 and return the device signal DEV as a reply to the electronic device 100.

Herein, the controller 310 generates the device signal DEV having corresponding content according to the connection standard adopted for the transmission of the electronic device 300. In some implementation forms, the electronic device 300 may use the I2C connection standard, a Universal Asynchronous Receiver/Transmitter (UART) connection standard or Universal Serial Bus (USB) 2.0 connection standard for transmission.

When the controller 104 of the electronic device 100 can receive the device signal DEV sent from the other electronic device 300 via the signal pin P2 and the first multiplexer circuit 102 at the first interface MCU_I1, it means that the electronic device 300 is a special device. Thus, the controller 104 can learn from the content of the device signal DEV the connection standard that the electronic device 300 uses for transmission, and accordingly selectively electrically connects the signal pin P2 of the connector 101 to the processor 103 or the controller 104 (step S04).

Figure 4:
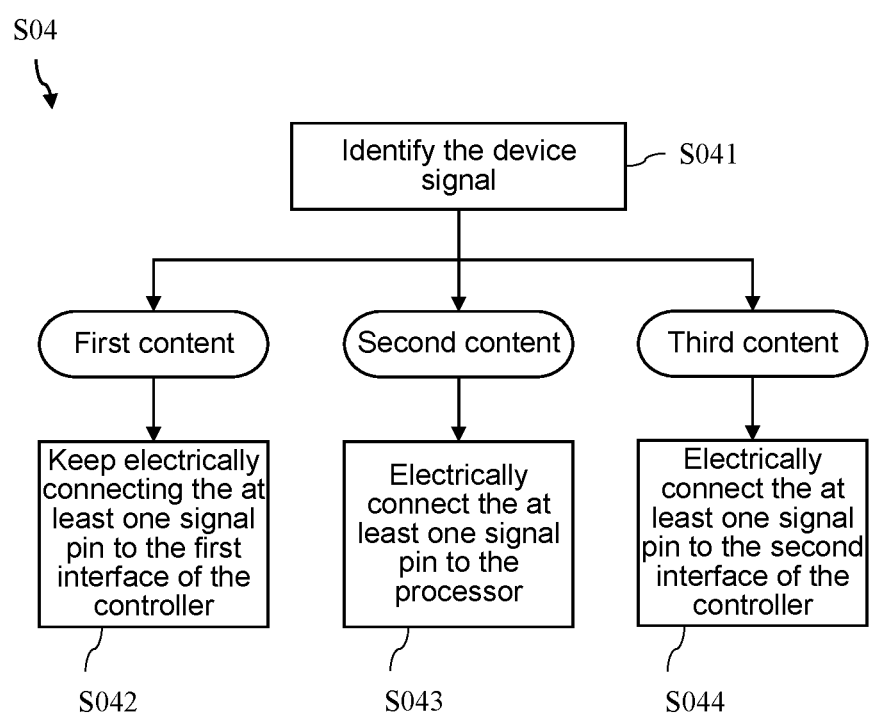
FIG. 4 is a flowchart of step S04 according to an embodiment.

FIG. 4 shows a flowchart of step S04 according to an embodiment. Referring to FIG. 2 to FIG. 4, in step S04 according to an embodiment, the controller 104 can perform identification on the device signal DEV (step S041). When the controller 104 identifies that the device signal DEV is first content the same as the connection standard adopted by the first interface MCU_I1 of the controller 104, the controller 104 can keep generating the selection signal SEL1 having the first set value to the first multiplexer circuit 102, so that the first multiplexer circuit 102 keeps electrically connecting the signal pin P2 of the connector 101 to the first interface MCU_I1 of the controller 104 (step S042).

In step S041 according to an embodiment, when the controller 104 identifies that the device signal DEV is second content, the controller 104 may generate a selection signal SEL1 having a second set value, so as to control the first multiplexer circuit 102 to switch the signal pin P2 of the connector 101 to be electrically connected to the processor 103 (step S043).

In some embodiments, the processor 103 includes a first interface CPU_I1, and the first multiplexer circuit 102 electrically connects the signal pin P2 to the first interface CPU_I1 of the processor 103 in step S043. In some implementation forms, the first interface CPU_I1 of the processor 103 may be implemented by a transmission interface of the USB 2.0 connection standard, and the second content of the device signal DEV is the USB 2.0 connection standard.

In some embodiments, the controller 104 may further include a second interface MCU_I2, and the connection standard adopted by the second interface MCU_I2 is different from the connection standard adopted by the first interface MCU_I1. In step S041 according to an embodiment, when the controller 104 identifies that the device signal DEV is third content, the controller 104 may generate a selection signal SEL1 having a third set value, so as to control the first multiplexer circuit 102 to switch the signal pin P2 of the connector 101 to be electrically connected to the second interface MCU_I2 of the controller 104 (step S044). In some implementation forms, the second interface MCU_I2 of the controller 104 may be implemented by a transmission interface of a UART connection standard, and the third content of the device signal DEV is the UART connection standard.

In addition, the processor 103 may also include a transmission interface CPU_I3 adopting a UART connection standard; in step S044, the controller 104 may also control the first multiplexer circuit 102 to electrically connect the signal pin P2 of the connector 101 to the transmission interface CPU_I3 adopting the UART connection standard in the processor 103.

In some embodiments, the second interface MCU_I2 of the controller 104 and the transmission interface CPU_I3 of the processor 103 may coexist. In some other embodiments, only one of the second interface MCU_I2 of the controller 104 and the transmission interface CPU_I3 of the processor 103 may exist.

In some embodiments, the electronic device 100 may further include a second multiplexer circuit 105 and an Extended Display Identification Data (EDID) read-only memory (ROM) 106, and the second multiplexer circuit 105 is coupled to the first multiplexer circuit 102, the processor 103, the controller 104 and the EDID ROM 106. The second multiplexer circuit 105 is for selectively electrically connecting the first multiplexer circuit 102 or the EDID ROM 106 to the processor 103 according to a selection signal SEL2 of the controller 104.

In some embodiments, when the controller 104 can receive the device signal DEV via the signal pin P2 and the first multiplexer circuit 102 at the first interface MCU_I1, the controller 104 may further generate a selection signal SEL2 having a first selection value to the second multiplexer circuit 105, so that the second multiplexer circuit 105 electrically connects the EDID ROM 106 to the processor 103 (step S05).

In some embodiments, the processor 103 further includes a second interface CPU_I2. In step S05, the second multiplexer circuit 105 electrically connects the EDID ROM 106 to the second interface CPU_I2 of the processor 103, so that the processor 103 can read Extended Display Identification Data (EDID) stored in the EDID ROM 106.

Referring to FIG. 1, in some embodiments, the electronic device 300 may be a common device without a controller (or referred to as a standard device), and the electronic device 300 does not generate the device signal DEV according to the confirmation command C1. In this case, the controller 104 of the electronic device 100 does not receive the device signal DEV after issuing the confirmation command C1 in step S03.

Referring to FIG. 1 and FIG. 2, in the signal switching method according to an embodiment, after the controller 104 performs step S03 and does not receive any device signal DEV as a reply, it means that the electronic device 300 is a common device and the pin signal P2 of the connector 101 merely serves an original intended purpose, for example, as a display data channel. Thus, the controller 104 may generate a selection signal SEL1 having a fourth set value to the first multiplexer circuit 102, so as to control the first multiplexer circuit 102 to electrically connect the signal pin P2 to the second multiplexer circuit 105, and may generate a selection signal SEL2 having a second selection value to the second multiplexer circuit 105, so as to control the second multiplexer circuit 105 to electrically connect the first multiplexer circuit 102 to the second interface CPU_I2 of the processor 103, such that the signal pin P2 of the connector 101 may be electrically connected to the second interface CPU_I2 of the processor 103 through the first multiplexer circuit 102 and the second multiplexer circuit 105 (step S06). As such, after step S06, the processor 103 of the electronic device 100 may perform transmission with the electronic device 300 through the connection path between the second interface CPU_I2 thereof and the signal pin P2. In some implementation forms, the connection path between the second interface CPU_I2 of the processor 103 and the signal pin P2 may be serve as a display data channel. For example, the electronic device 300 may transmit EDID through the connection path to the processor 103 of the electronic device 100. It should be noted that, in step S06, the second multiplexer circuit 105 disconnects the connection path from the EDID ROM 106 to the second interface CPU_I2 of the processor 103, and forms the connection path from the first multiplexer circuit 102 to the second interface CPU_I2 of the processor 103 instead.

Figure 5:
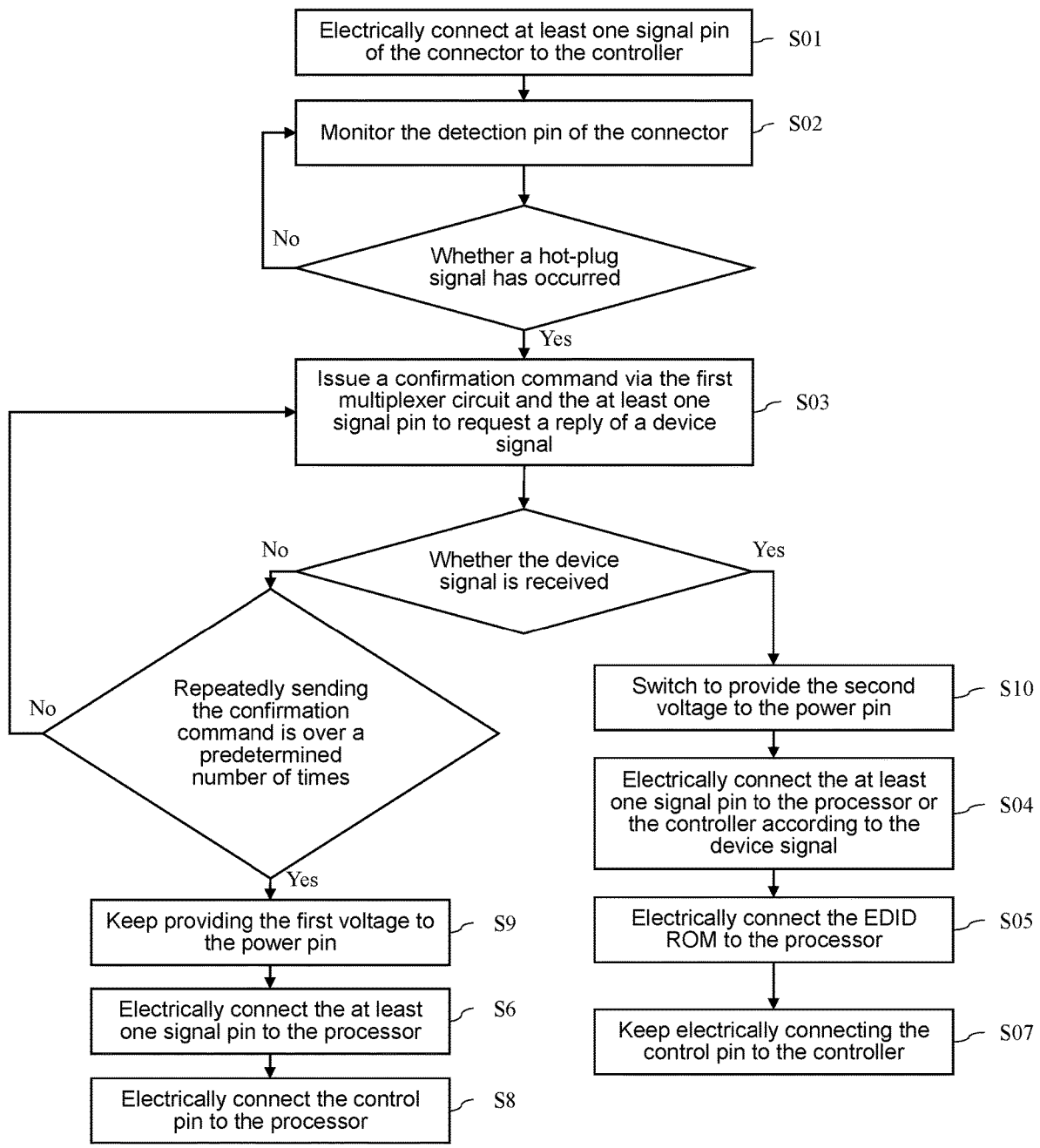
FIG. 5 is a flowchart of a signal switching method according to an embodiment.

FIG. 5 shows a flowchart of a signal switching method according to an embodiment. Referring to FIG. 1 to FIG. 5, in some embodiments, the controller 104 may wait for a predetermined period of time after issuing the confirmation command C1, and if the device signal DEV is not yet received before the predetermined period of time expires, the controller 104 may determine that the electronic device 300 is only a common device and performs step S06 (that is, performing step S03 only once), as shown in FIG. 2. In some other embodiments, the controller 104 may perform step S03 for a predetermined number of times, and if the device signal DEV is not yet received after performing step S03 for the predetermined number of times, the controller 104 then determines that the electronic device 300 is only a common device and performs step S06, as shown in FIG. 5. In some implementation forms, the predetermined number of times may be between 3 and 10; however, the present invention is not limited to these exemplary values, and the predetermined number of times may be any appropriate value.

Figure 6:
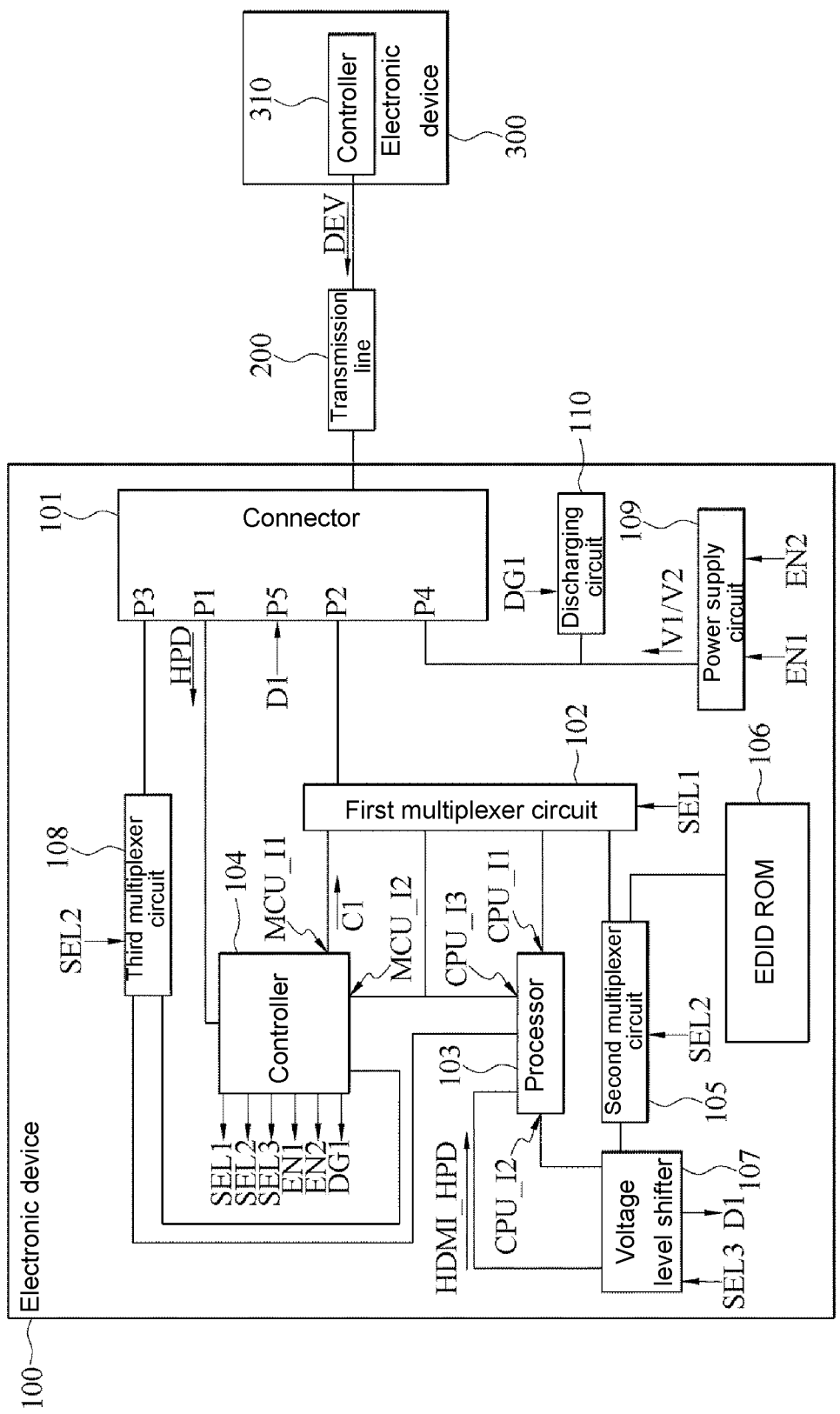
FIG. 6 is a block schematic diagram of a special device connected to an electronic device according to an embodiment of the present invention.
Figure 7:
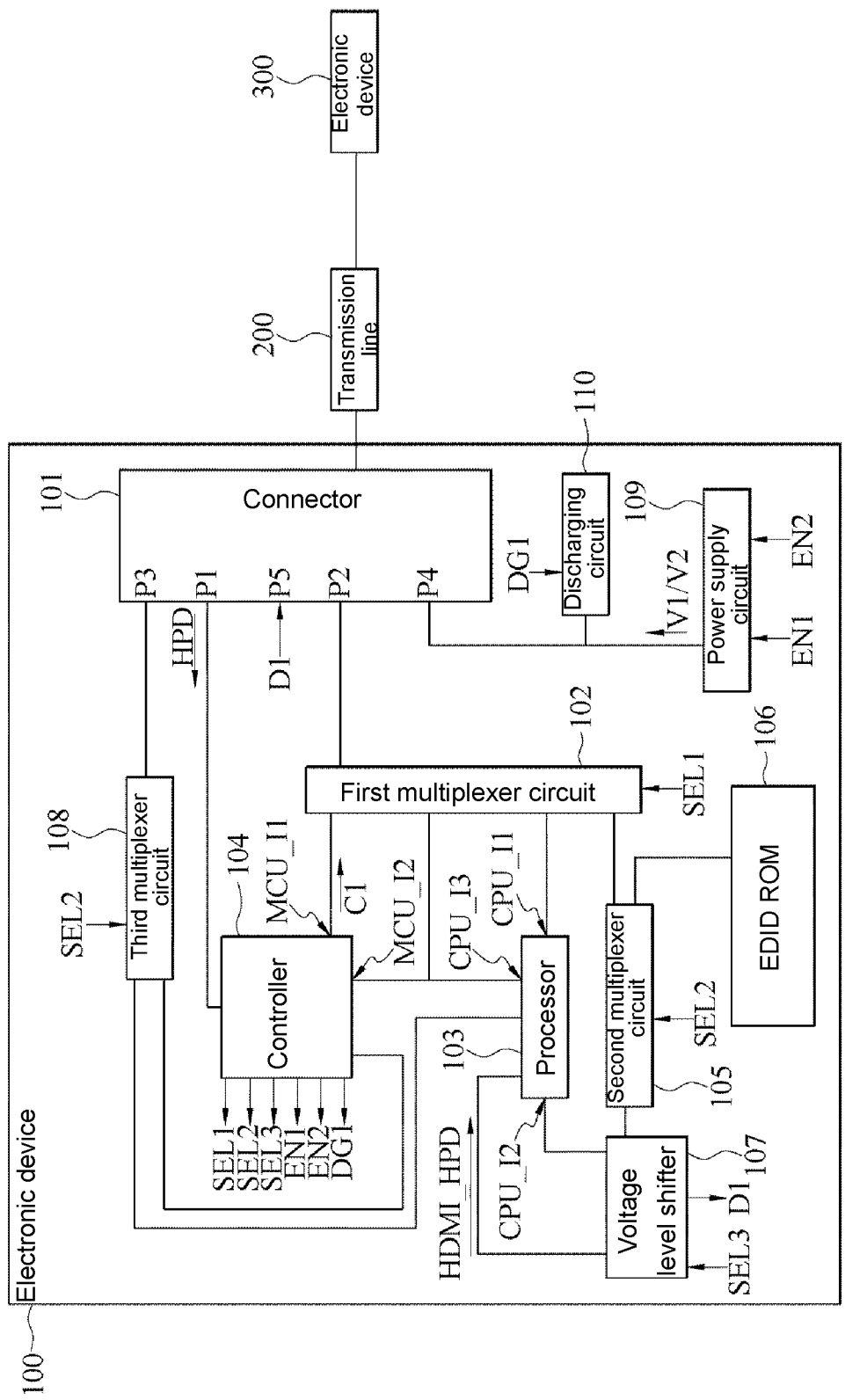
FIG. 7 is a block schematic diagram of a common device connected to an electronic device according to an embodiment of the present invention.

FIG. 6 shows a block schematic diagram of a special device connected to an electronic device according to an embodiment of the present invention. FIG. 7 shows a block schematic diagram of a common device connected to an electronic device according to an embodiment of the present invention. Referring to FIG. 2 and FIG. 5 to FIG. 7, in some embodiments, the electronic device 100 may further include a voltage level shifter 107 which is coupled between the processor 103 and the second multiplexer circuit 105. In other words, the second multiplexer circuit 105 may be electrically connected to the processor 103 through the voltage level shifter 107. Thus, in step S05 according to an embodiment, the controller 104 controls the second multiplexer circuit 105 to electrically connect the EDID ROM 106 to the voltage level shifter 107, so that the EDID ROM 106 may be electrically connected to the second interface CPU_I2 of the processor 103 through the voltage level shifter 107.

Moreover, in step S06 according to an embodiment, the controller 104 controls the first multiplexer circuit 102 to electrically connect the signal pin P2 to the second multiplexer circuit 105, and controls the second multiplexer circuit 105 to electrically connect the first multiplexer circuit 102 to the voltage level shifter 107, so that the signal pin P2 of the connector 101 may be electrically connected to the second interface CPU_I2 of the processor 103 through the first multiplexer circuit 102, the second multiplexer circuit 105 and the voltage level shifter 107.

In some embodiments, the voltage level shifter 107 can be used for shifting a voltage level. For example, after step S06 is performed, the second interface CPU_I2 of the processor 103 is used as a display data channel through the connection path between the voltage level shifter 107 and the signal pin P2, and the electronic device 300 may transmit EDID via this connection path for the processor 103. Herein, the voltage level shifter 107 may perform voltage level shifting (for example, from 5 V to 3V) on the EDID received, and then transmit the EDID that has undergone the voltage level shifting to the processor 103.

In some embodiments, the connector 101 may further include a video pin P5, and the voltage level shifter 107 may be further coupled to the video pin P5 and the controller 104. Herein, the voltage level shifter 107 serves as a repeater. The voltage level shifter 107 may receive a selection signal SEL3 from the controller 104, and selectively generate a notification signal HDMI_HPD to the processor 103 according to the selection signal SEL3. When the selection signal SEL3 has a first selection value, the voltage level shifter 107 does not output the notification signal HDMI_HPD; when the selection signal SEL3 has a second selection value, the voltage level shifter 107 outputs the notification signal HDMI_HPD to the processor 103. Upon receiving the notification signal HDMI_HPD, the processor 103 outputs video data D1 to the voltage level shifter 107, and the voltage level shifter 107 enhances the video data D1 and outputs the enhanced video data D1 through the video pin P5 of the connector 101 to the electronic device 300, for the electronic device 300 to display corresponding video and audio. However, the present invention is not limited to the examples above. In some other embodiments, the processor 103 may also directly output the video data D1 to the video pin P5 of the connector 101 according to an instruction of the controller 104.

In some implementation forms, the video pin P5 of the connector 101 may be pin #1 to pin #12 used for transmitting time-minimized differential signal (TMDS) in a standard HDMI connection port. Moreover, the voltage level shifter 107 may be implemented by an integrated circuit, so as to have both the voltage level shifting and signal enhancement function.

Referring to FIG. 1, FIG. 3, FIG. 6 and FIG. 7, in some embodiments, the electronic device 100 further includes a third multiplexer circuit 108, the connector 101 further includes a control pin P3, and the third multiplexer circuit 108 is coupled to the control pin P3, the processor 103 and the controller 104. The third multiplexer circuit 108 is for selectively electrically connecting the control pin P3 of the connector 101 to the processor 103 or the controller 104 according to the selection signal SEL2.

In some implementation forms, the control pin P3 of the connector 101 may be pin #13 for Consumer Electronics Control (CEC) in a standard HDMI connection port.

Figure 8:
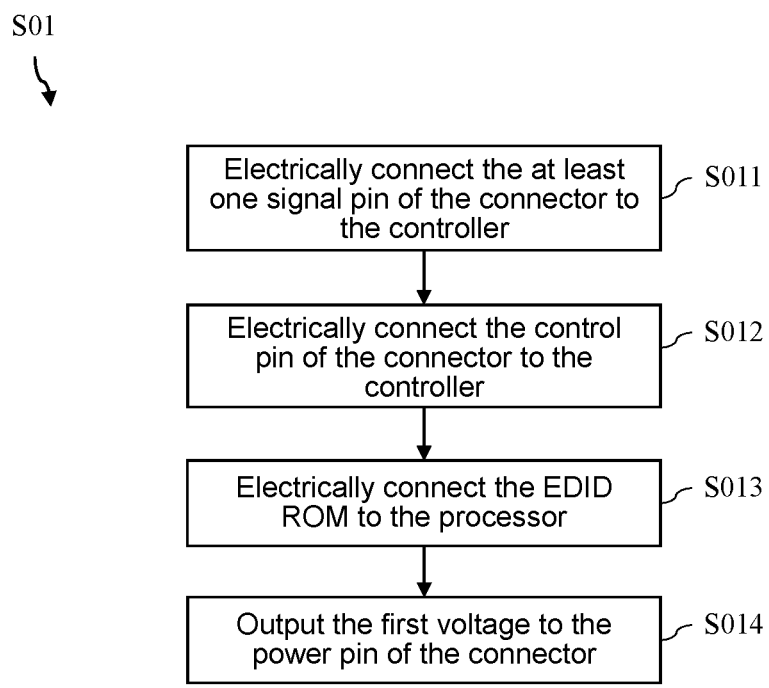
FIG. 8 is a flowchart of step S01 according to an embodiment.

FIG. 8 shows a flowchart of step S01 according to an embodiment. Referring to FIG. 1 to FIG. 8, in step S01 of the signal switching method according to an embodiment, in addition to using the first multiplexer circuit 102 to electrically connect the at least one signal pin P2 of the connector 101 to the controller 104 according to the selection signal SEL1 generated by the controller 104 (step S011), the electronic device 100 further uses the third multiplexer circuit 108 to electrically connect the control pin P3 of the connector 101 to the controller 104 according to the selection signal SEL2 generated by the controller 104 (step S012), and uses the second multiplexer circuit 105 to electrically connect the EDID ROM 106 to the processor 103 (or couple to the voltage level shifter 107) according to the selection signal SEL2 (step S013).

In some embodiments, the selection signal SEL1 generated by the controller 104 in a default state has the first set value and the selection signal SEL2 has the first selection value, such that the first multiplexer circuit 102 may normally electrically connect the signal pin P2 to the controller 104 according to the first set value of the selection signal SEL1, the third multiplexer circuit 108 may normally electrically connect the control pin P3 to the controller 104 according to the first selection value of the selection signal SEL2, and the second multiplexer circuit 105 may normally electrically connect the EDI D ROM 106 to the processor 103 (or couple to the voltage level shifter 107) according to the first selection value of the selection signal SEL2.

In some embodiments, when the electronic device 300 is a special device, the electronic device 300 may output an activation signal to the control pin P3 of the connector 101. In some implementation forms, the activation signal may be generated by a power key. However, the present invention is not limited to the examples above, and in some other implementation forms, the activation signal may also be generated during system activation of the electronic device 300. In some other embodiments, when the electronic device 300 is a common device, a standard CEC signal may be transmitted on the control pin P3 of the connector 101 between the electronic device 100 and the electronic device 300.

Thus, in the signal switching method according to some embodiments, when the controller 104 receives the device signal DEV at the first interface MCU_I1, the controller 104 keeps generating the selection signal SEL2 having the first selection value, so that the third multiplexer circuit 108 keeps electrically connecting the control pin P3 of the connector 101 to the controller 104 (step S07). When the controller 104 does not receive any device signal DEV as a reply after performing step S03 or after performing step S03 for the predetermined number of times, the controller 104 generates the selection signal SEL2 having the second selection value, so that the third multiplexer circuit 108 switches to electrically connect the control pin P3 of the connector 101 to the processor 103 (step S08). In some implementation forms, the first selection value may be logic "0", and the second selection value may be logic "1"; however, the present invention is not limited to the above, and the first selection value and the second selection value may be designed according to application requirements.

In some embodiments, the electronic device 100 further includes a power supply circuit 109, the connector 101 further includes a power pin P4, and the power supply circuit 109 is coupled to the power pin P4 and the controller 104. The power supply circuit 109 can provide a first voltage V1 or a second voltage V2 to the power pin P4 according to the control of the controller 104. When the controller 104 outputs a first enable signal EN1 to the power supply circuit 109, the power supply circuit 109 outputs the first voltage V1 to the power pin P4. When the controller 104 outputs a second enable signal EN2 to the power supply circuit 109, the power supply circuit 109 outputs the second voltage V2 to the power pin P4. In addition, the second voltage V2 is higher than the first voltage V1.

In some implementation forms, the power pin P4 of the connector 101 may be pin #18 for power supply in a standard HDMI connection port. The first voltage V1 may be, for example but not limited to, 5 V, the second voltage V2 may be, for example but not limited to, 12 V, 14 V, 19 V, 24 V or 48 V, and the values of the first voltage V1 and the second voltage V2 may be designed according to requirements of the electronic device 300.

In step S01 of the signal switching method according to an embodiment, in addition to step S011, step S012 and step S013, the electronic device 100 may further use the power supply circuit 109 to output the first voltage V1 to the power pin P4 of the connector 101 according to the first enable signal EN1 generated by the controller 104 (step S014), as shown in FIG. 8. In some embodiments, the controller 104 in a default state normally outputs the first enable signal EN1 to the power supply circuit 109, so that the power supply circuit 109 normally provides the first voltage V1 to the power pin P4 according to the first enable signal EN1. It should be noted that, the present invention does not define that step S011, step S012, step S013 and step S014 have to be performed in the order shown in FIG. 8, and step S011, step S012, step S013 and step S014 may be performed simultaneously or in predetermined order.

Moreover, in the signal switching method according to some embodiments, as shown in FIG. 2 or FIG. 5, when the controller 104 does not receive any device signal DEV as a reply after performing step S03 or after performing step S03 for the predetermined number of times, the controller 104 keeps outputting the first enable signal EN1 to the power supply circuit 109, so that the power supply circuit 109 keeps providing the first voltage V1 to the power pin P4 according to the first enable signal EN1 (step S09). After the controller 104 performs step S03 and the device signal DEV can be received from the first interface MCU_I1, the controller 104 does not output the first enable signal EN1 but instead output the second enable signal EN2 to the power supply circuit 109, so that the power supply circuit 109 stops outputting the first voltage V1, and switches to provide the second voltage V2 to the power pin P4 according to the second enable signal EN2 (step S10).

It should be noted that, the present invention does not define that step S10, step S04, step S05 and step S07 have to be performed in the order shown in the drawings, and step S10, step S04, step S05 and step S07 may be performed simultaneously or in predetermined order. Moreover, the present invention likewise does not define that step S09, step S06 and step S08 have to be performed in the order shown in the drawings, and step S09, step S06 and step S08 may be performed simultaneously or in predetermined order.

Figure 9:
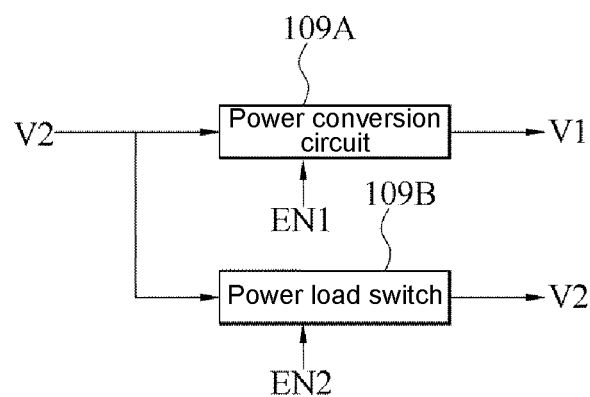
FIG. 9 is a block schematic diagram of a power supply circuit according to an embodiment.

FIG. 9 shows a block schematic diagram of a power supply circuit according to an embodiment. Referring to FIG. 1 to FIG. 9, in some embodiments, the power supply circuit 109 may include a power conversion circuit 109A and a power load switch 109B. The power conversion circuit 109A is coupled to the controller 104 and the power pin P4, and the power load switch 109B is coupled to the controller 104 and the power pin P4. The power conversion circuit 109A is for converting the second voltage V2 to the first voltage V1, and outputting the first voltage V1 obtained from the conversion to the power pin P4 upon receiving the first enable signal EN1 generated by the controller 104. The power load switch 109B is for receiving the second voltage V2, and outputting the second voltage V2 to the power pin P4 upon receiving the second enable signal EN2 generated by the controller 104.

In some implementation forms, the power conversion circuit 109A may be implemented by, for example but not limited to, a low dropout linear regulator (LDO). In addition, the power load switch 109B may be implemented by, for example but not limited to, a metal-oxide-semiconductor field-effect transistor (MOSFET), a bipolar junction transistor (BJT), a GaN FET or an insulated gate bipolar transistor (IGBT).

Figure 10:
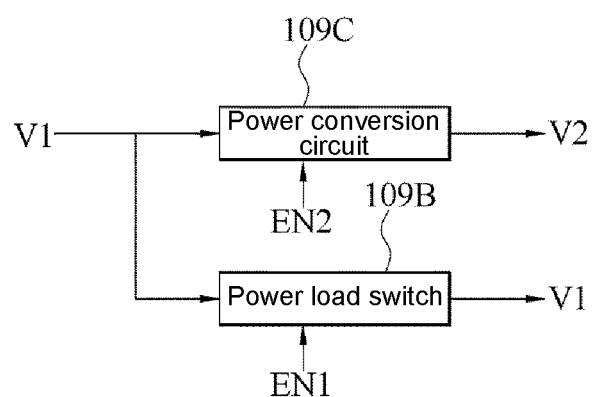
FIG. 10 is a block schematic diagram of a power supply circuit according to an embodiment.

FIG. 10 shows a block schematic diagram of a power supply circuit according to an embodiment. Referring to FIG. 1 to FIG. 10, in some other embodiments, the power supply circuit 109 may include a power conversion circuit 109C and the power load switch 109B. The power conversion circuit 109C is coupled to the controller 104 and the power pin P4, and the power load switch 109B is coupled to the controller 104 and the power pin P4. The power conversion circuit 109C is for converting the first voltage V1 to the second voltage V2, and outputting the second voltage V2 obtained from the conversion to the power pin P4 upon receiving the second enable signal EN2 generated by the controller 104. The power load switch 109B is for receiving the first voltage V1, and outputting the first voltage V1 to the power pin P4 upon receiving the first enable signal EN1 generated by the controller 104. In some implementation forms, the power conversion circuit 109C may be implemented by, for example but not limited to, a buck converter.

In some embodiments, the electronic device 100 may further include a discharging circuit 110 which is coupled to the power pin P4. The charging circuit 110 may discharge the power pin P4 or stop discharging the power pin P4 according to a discharging signal DG1 of the controller 104. In some implementation forms, when the discharging signal DG1 is at a high potential, the discharging circuit 110 may discharge the power pin P4. When the discharging signal DG1 is at a low potential, the discharging circuit 110 does not discharge the power pin P4 or stops discharging the power pin P4. However, the present invention is not limited to the above, and the discharging circuit 110 may also be modified to discharge the power pin P4 when the discharging signal DG1 is at a low potential, and may not discharge the power pin P4 or stop discharging the power pin P4 when the discharging signal DG1 is at a high potential.

Figure 11:
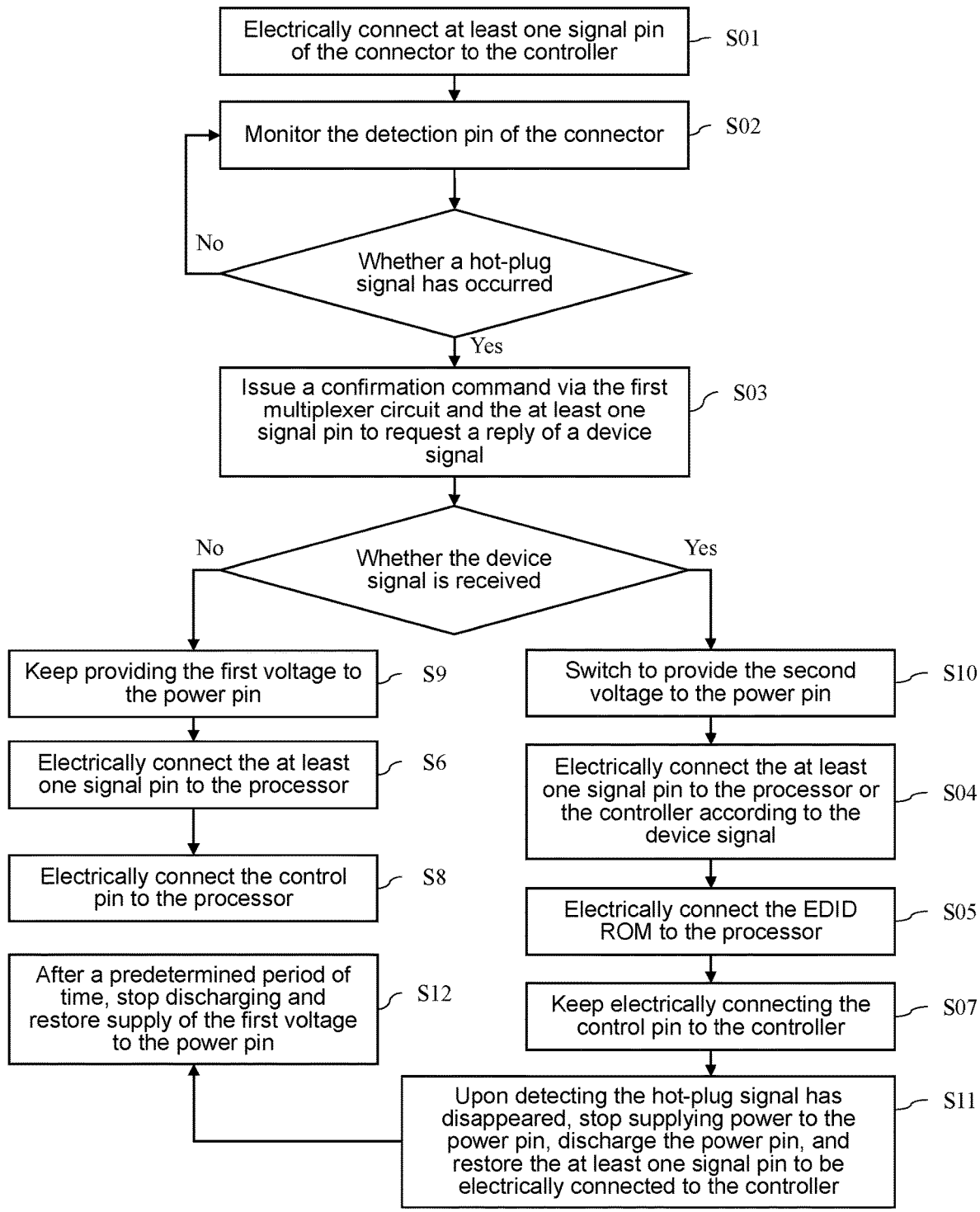
FIG. 11 is a flowchart of a signal switching method according to an embodiment.

FIG. 11 shows a flowchart of a signal switching method according to an embodiment. Referring to FIG. 1 to FIG. 11, in the signal switching method according to an embodiment, after the hot-plug signal HPD occurring at the detection pin P1 is detected, the controller 104 performs a hysteretic separation detection on the detection pin P1, for example, only determines that the hog-plug signal HPD has disappeared from the detection pin P1 upon detecting a separation signal lasting for a period of time. Accordingly, the controller 104 is able to accurately determine whether the electronic device 300 is still connected to the connector 101, and does not make any misjudgment as a result of instantaneous disconnection caused by non-connection problems.

In some embodiments, as shown in FIG. 11, when the power supply circuit 109 provides the second voltage V2 to the power pin P4 (that is, after step S10 is performed) and it is detected that the hot-plug signal HPD has disappeared from the detection pin P1, the controller 104 does not output the first enable signal EN1 or the second enable signal EN2, so that the power supply circuit 109 stops supplying power to the power pin P4 and outputs the discharging signal DG1. As a result, the discharging circuit 110 discharges the power pin P4, and generates the selection signal SEL1 having the first set value, so that the first multiplexer circuit 102 restores electrical connection of the signal pin P2 to the controller 104, for example, to the first interface MCU_I1 of the controller 104 (step S11). After the discharging circuit 110 discharges the power pin P4 for a predetermined period of time, the controller 104 stops outputting the discharging signal DG1 so that the discharging circuit 110 stops discharging the power pin P4, and outputs the first enable signal EN1 so as to control the power supply circuit 109 to restore supply of the first voltage V1 to the power pin P4 (step S12). Since the electronic device 100 of the present invention can release residual voltage from the power pin P4 through the discharging circuit 110, the electronic device 300 that next connects to the connector 101 does not become damaged by any residual voltage on the power pin P4.

In some implementation forms, the predetermined time in step S12 may be several hundreds of milliseconds; however, the present invention is not limited to the above.

In some other embodiments, the controller 104 performs step S11 and step S12 upon detecting that the hot-plug signal HPD has disappeared. In other words, even if the controller 104 detects that the hot-plug signal HPD has disappeared from the detection pin P1 while the power supply circuit 109 provides the first voltage V1 to the power pin P4, the controller 104 still performs step S11 and step S12 to release the residual voltage from the power pin P4, thereby ensuring that the electronic device 300 that next connects to the connector 101 does not become damaged by any residual voltage on the power pin P4.

In some other embodiments, upon detecting that the hot-plug signal HPD has disappeared, the controller 104 may first determine if an instantaneous disconnection of the electronic device 300 exists, for example, whether the hot-plug signal HPD again appears within a predetermined period of time, e.g., 50 ms. When the controller 104 determines that the instantaneous disconnection exists, the controller 104 may keep all current settings, and does not perform step S11 or step S12. Conversely, when the controller 104 determines that the instantaneous disconnection does not exist, the controller 104 performs step S11 and step S12 to release the residual voltage from the power pin P4.

Figure 12:
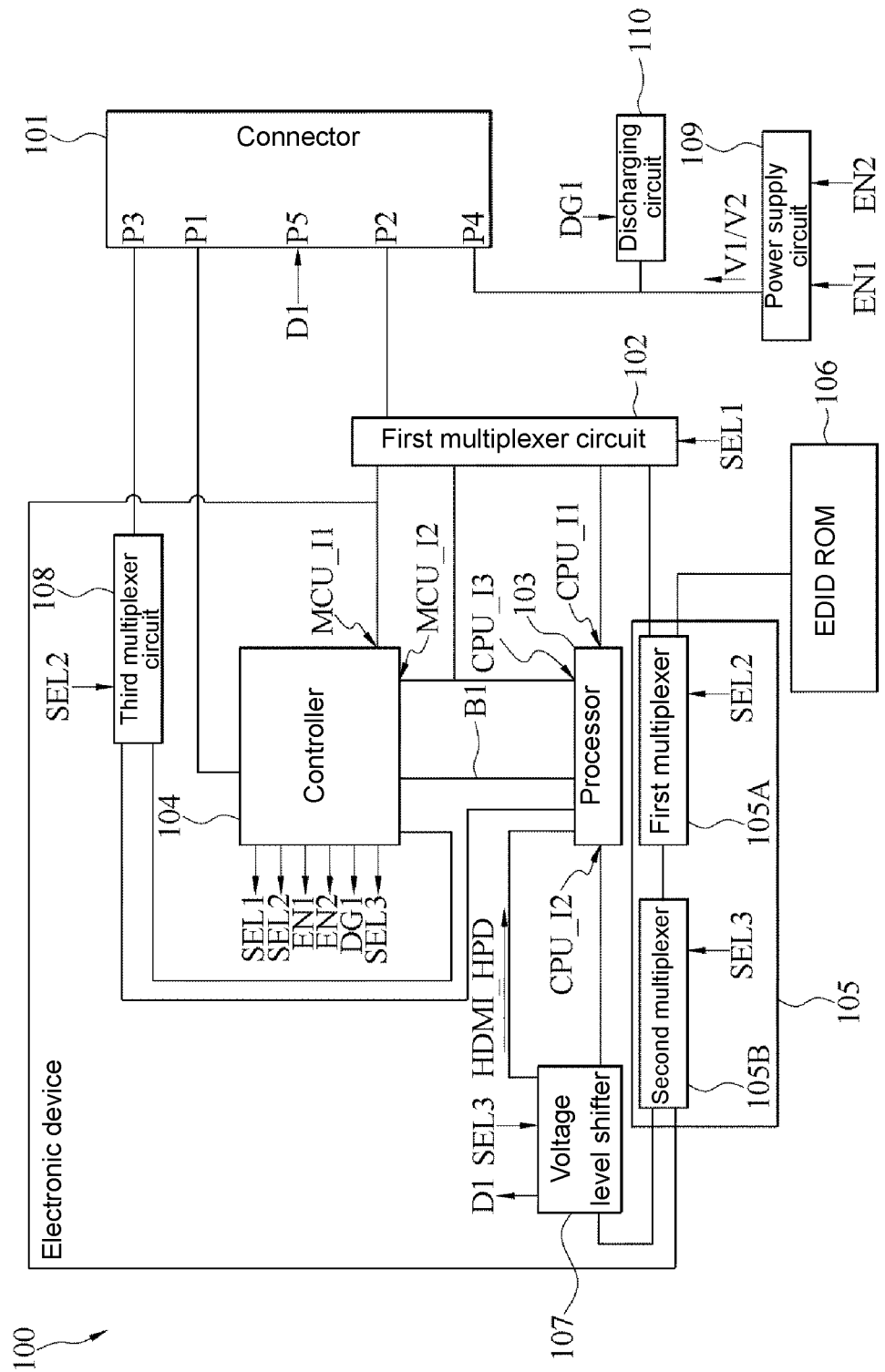
FIG. 12 is a block schematic diagram of an electronic device according to an embodiment.

FIG. 12 shows a block schematic diagram of an electronic device according to an embodiment. Referring to FIG. 12, in some embodiments, when the processor 103 of the electronic device 100 receives update data for updating the EDID ROM 106, the processor 103 may provide the update data to the controller 104 through a bus B1 for the controller 104 to update the EDID ROM 106. In some implementation forms, the bus B1 may be an I2C bus.

After the controller 104 receives the update data, the controller 104 may control the second multiplexer circuit 105 to electrically connect the controller 104 to the EDID ROM 106, so that the controller 104 can update the EDID ROM 106 using the update data.

In some embodiments, the second multiplexer circuit 105 may include a first multiplexer 105A and a second multiplexer 105B. The first multiplexer 105A is coupled to the first multiplexer circuit 102, the EDID ROM 106, the second multiplexer 105B and the controller 104, and the second multiplexer 105B is coupled to the processor 103 (or coupled to the voltage level shifter 107) and the controller 104. The first multiplexer 105A is for selectively electrically connecting the first multiplexer circuit 102 or the EDID ROM 106 to the second multiplexer 105B according to the selection signal SEL2 of the controller 104, and the second multiplexer 105B is for selectively electrically connecting the first interface MCU_I1 of the controller 104 or the processor 103 (or the voltage level shifter 107) to the first multiplexer 105A according to the selection signal SEL3 of the controller 104.

In some embodiments, the controller 104 may normally generate the selection signal SEL3 having the second selection value to the second multiplexer 105B, so that the second multiplexer 105B normally electrically connects the first multiplexer 105A to the processor 103 (or the voltage level shifter 107). In addition, the controller 104 may generate the selection signal SEL3 having the first selection value to the second multiplexer 105B only when the update data is received, so that the second multiplexer 105B electrically connects the first multiplexer 105A to the first interface MCU_I1 of the controller 104.

Thus, when the selection signal SEL2 has the first selection value and the selection signal SEL3 has the first selection value, the first multiplexer 105A electrically connects the EDID ROM 106 to the second multiplexer 105B, and the second multiplexer 105B electrically connects the first multiplexer 105A to the first interface MCU_I1 of the controller 104, such that the controller 104 may be electrically connected to the EDID ROM 106 by the first interface MCU_I1 sequentially through the second multiplexer 105B and the first multiplexer 105A. Accordingly, the controller 104 can update the EDID ROM 106 using the update data.

In some embodiments, the update data may be stored in a storage device, and the processor 103 may obtain the update data by accessing the storage device. In some implementation forms, the storage device may be a hard drive or a portable disk.

Referring to FIG. 12, in one embodiment, the electronic device 100 having different output powers includes a connector 101, a controller 104 and a power supply circuit 109. The power supply circuit 109 is coupled to the connector 101, and the controller 104 is coupled to the connector 101 and the power supply circuit 109.

The connector 101 includes a detection pin P1, at least one signal pin P2 and a power pin P4. The power supply circuit 109 is coupled to the power pin P4, and provides a first voltage V1 to the power pin P4. Herein, the power supply circuit 109 normally provides the first voltage V1 to the power pin P4. The controller 104 is electrically connected to the at least one signal pin P2, and monitors a detection pin P1. Upon detecting a hot-plug signal HPD occurring at the detection pin P1, it means that the electronic device 300 is connected to the electronic device 100 through the connector 101, and the controller 104 issues a confirmation command C1 via the at least one signal pin P2 to request the electronic device 300 to return a device signal DEV as a reply.

When the device signal DEV is not received after the confirmation command C1 is issued, or the device signal DEV as a reply is not received after repeatedly sending the confirmation command C1 is over a predetermined number of times, the controller 104 controls the power supply circuit 109 (for example, outputting a first enable signal EN1 to the power supply circuit 109) to keep providing the first voltage V1 to the power pin P4. When the device signal DEV as a reply from the electronic device 300 is received after the confirmation command C1 is issued, the controller 104 controls the power supply circuit 109 (for example, switches to output a second enable signal EN2 to the power supply circuit 109) to switch to provide a second voltage V2 higher than the first voltage V1 to the power pin P4.

In some embodiments, the electronic device 100 having different output powers may further include a discharging circuit 110 which is coupled to the power pin P4. When the power supply circuit 109 provides the second voltage V2 to the power pin P4, upon detecting by the controller 104 that the hot-plug signal HPD occurring at the detection pin P1 has disappeared, the controller 104 controls the power supply circuit 109 to stop supplying power to the power pin P4, and controls the discharging circuit 110 to discharge the power pin P4 so as to release the residual voltage from the power pin P4. After discharging for a predetermined period of time, the controller 104 again controls the discharging circuit 110 to stop discharging, and controls the power supply circuit 109 to restore supply of the first voltage V1 to the power pin P4.

Figure 13:
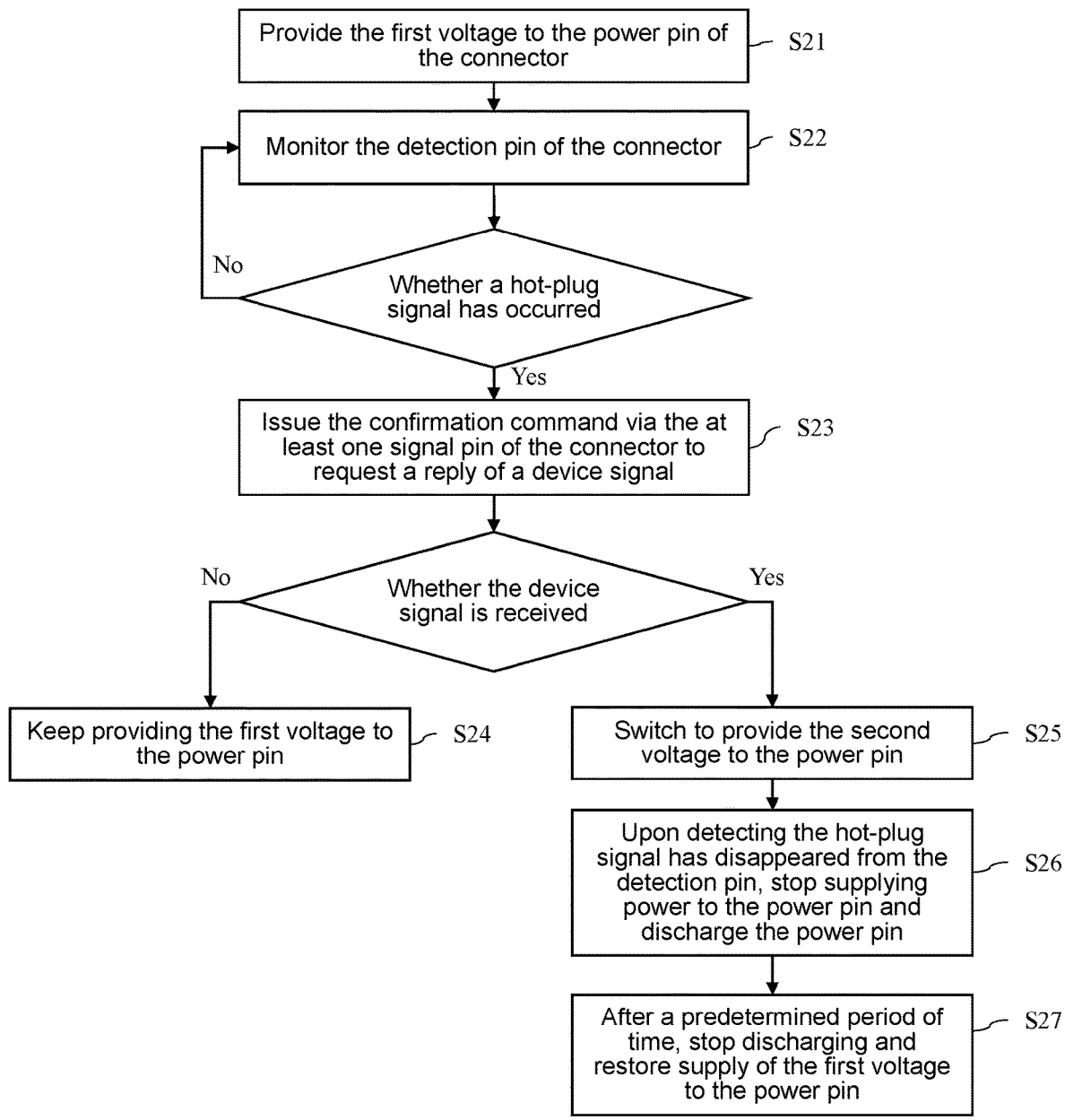
FIG. 13 is a flowchart of a power supply method according to an embodiment.

The electronic device 100 of any embodiment of the present invention is capable of performing the power supply method according to any embodiment. FIG. 13 shows a flowchart of a power supply method according to an embodiment. Referring to FIG. 13, in the power supply method according to an embodiment, the controller 104 of the electronic device 100 may use the power supply circuit 109 to provide the first voltage V1 to the power pin P4 of the connector 101 (step S21), and detect the detection pin P1 of the connector 101 (step S22). Upon detecting a hot-plug signal HPD occurring at the detection pin P1, the controller 104 issues the confirmation command C1 via the at least one signal pin P2 of the connector 101 to request the electronic device 300 to return the device signal DEV as a reply (step S23). When the device signal DEV is not received, the controller 104 uses the power supply circuit 109 to keep providing the first voltage V1 to the power pin P4 (step S24). When the device signal DEV is received, the controller 104 uses the power supply circuit 109 to switch to provide the second power V2 to the power pin P4 (step S25). Wherein, the second voltage V2 is higher than the first voltage V1.

In the power supply method according to an embodiment, when the power supply circuit 109 provides the second voltage V2 to the power pin P4, upon detecting by the controller 104 that the hot-plug signal HPD occurring at the detection pin P1 has disappeared, the controller 104 controls the power supply circuit 109 to stop supplying power to the power pin P4, and controls the discharging circuit 110 to discharge the power pin P4 (step S26). After discharging for a predetermined period of time, the controller 104 again controls the discharging circuit 110 to stop discharging, and controls the power supply circuit 109 to restore supply of the first voltage V1 to the power pin P4 (step S27).

In conclusion, in the electronic device with a connector supporting multiple connection standards and the signal switching method thereof according to the embodiments of the present invention, the confirmation command is issued via at least one signal pin of the connector to request a reply of a device signal, and the transmission path of the at least one signal pin of the connector is switched according to whether the device signal is received, so that a single connector is enabled to support multiple connection standards. Thus, the electronic device is able to perform transmission with a common device or a special device via this single connector, and to selectively apply one from the multiple connection standards. Moreover, in the electronic device with a connector supporting multiple connection standards, the signal switching method thereof and the power supply method thereof, and the electronic device having different output powers according to the embodiments of the present invention, the confirmation command is issued via at least one signal pin of the connector to request a reply of a device signal, and the first voltage or the second voltage is selectively provided to the power pin according to whether the device signal is received, so that the electronic device is able to connect to a common device or a special device that uses different voltages via this single connector.

The technical contents of the present invention are disclosed by way of the preferred embodiments above. However, these embodiments are not to be construed as limitations to the present invention. Slight modifications and variations made by a person skilled in the art without departing from the spirit and scope of the present invention are encompassed within the scope of the present invention. Therefore, the scope of protection of the present invention shall be defined by the appended claims.

What is claimed is:

1. An electronic device with a connector supporting multiple connection standards, comprising:
   the connector, comprising a detection pin and at least one signal pin;
   a first multiplexer circuit, coupled to the at least one signal pin;
   a processor, coupled to the first multiplexer circuit; and
   a controller, monitoring the detection pin;
   wherein the first multiplexer circuit electrically connects the at least one signal pin to the controller;
   wherein upon detecting a hot-plug signal occurring at the detection pin, the controller issues a confirmation command via the first multiplexer circuit and the at least one signal pin to request a reply of a device signal; and wherein upon receiving the device signal, the controller controls the first multiplexer circuit according to the device signal to electrically connect the at least one signal pin to the processor or the controller.

2. The electronic device with a connector supporting multiple connection standards of claim 1, further comprising:

a second multiplexer circuit, coupled to the first multiplexer circuit;

wherein when the device signal is not received, the controller controls the first multiplexer circuit to electrically connect the at least one signal pin to the second multiplexer circuit, and controls the second multiplexer circuit to electrically connect the first multiplexer circuit to the processor, so that the at least one signal pin is electrically connected to processor through the first multiplexer circuit and the second multiplexer circuit.

3. The electronic device with a connector supporting multiple connection standards of claim 2, further comprising:

a voltage level shifter, wherein the second multiplexer circuit is electrically connected to the processor through the voltage level shifter.

4. The electronic device with a connector supporting multiple connection standards of claim 2, further comprising:

an Extended Display Identification Data (EDID) read-only memory (ROM), coupled to the second multiplexer circuit;

wherein when the processor receives update data, the processor provides the update data to the controller; and wherein when the controller receives the update data, the controller controls the second multiplexer circuit to electrically connect the controller to the EDID ROM, so that the controller updates the EDID ROM using the update data through the second multiplexer circuit.

5. The electronic device with a connector supporting multiple connection standards of claim 1, the connector further comprising a control pin, the electronic device further comprising:

a third multiplexer circuit, electrically connecting the control pin to the controller;

wherein upon receiving the device signal, the controller controls the third multiplexer circuit to keep electrically connecting the control pin to the controller.

6. The electronic device with a connector supporting multiple connection standards of claim 5, wherein when the device signal is not received, the controller controls the third multiplexer circuit to electrically connect the control pin to the processor.

7. The electronic device with a connector supporting multiple connection standards of claim 1, the connector further comprising a power pin, the electronic device further comprising:

a power supply circuit, coupled to the power pin, providing a first voltage to the power pin;

wherein when the device signal is not received, the controller controls the power supply circuit to keep providing the first voltage to the power pin;

wherein when the device signal is received, the controller controls the power supply circuit to switch to provide a second voltage to the power pin; and wherein, the second voltage is higher than the first voltage.

8. The electronic device with a connector supporting multiple connection standards of claim 7, further comprising:

a discharging circuit, coupled to the power pin;

wherein when the power supply circuit provides the second voltage to the power pin, upon detecting by the controller that the hot-plug signal has disappeared from the detection pin, the controller controls the first multiplexer circuit to restore electrical connection of the at least one signal pin to the controller, controls the power supply circuit to stop supplying power, and controls the discharging circuit to discharge; and wherein after a predetermined period of the discharging, the controller controls the discharging circuit to stop discharging and controls the power supply circuit to provide the first voltage to the power pin.

9. The electronic device with a connector supporting multiple connection standards of claim 1, wherein when the device signal is first content, the controller controls the first multiplexer circuit to keep electrically connecting the at least one signal pin to the controller, wherein when the device signal is second content, the controller controls the first multiplexer circuit to electrically connect the at least one signal pin to the processor.

10. The electronic device with a connector supporting multiple connection standards of claim 9, wherein the controller comprises a first interface and a second interface of different connection standards, and the first multiplexer circuit electrically connects the at least one signal pin to the first interface of the controller, wherein when the device signal is third content, the controller controls the first multiplexer circuit to electrically connect the at least one signal pin to the second interface of the controller.

11. A signal switching method for a connector supporting multiple connection standards, comprising:

electrically connecting at least one signal pin of a connector to a controller;

monitoring a detection pin of the connector;

upon detecting a hot-plug signal occurring at the detection pin, the controller issuing a confirmation command via a first multiplexer circuit and the at least one signal pin to request a reply of a device signal; and upon receiving the device signal, electrically connecting the at least one signal pin to a first interface of a processor or the controller according to the device signal.

12. The signal switching method for a connector supporting multiple connection standards of claim 11, further comprising:

when the device signal is not received, switching the at least one signal pin to be electrically connected to a second interface of the processor.

13. The signal switching method for a connector supporting multiple connection standards of claim 11, further comprising:

when the device signal is not received, switching the at least one signal pin to be electrically connected to a voltage level shifter, so that the at least one signal pin is electrically connected to a second interface of the processor through the voltage level shifter.

14. The signal switching method for a connector supporting multiple connection standards of claim 11, further comprising:

electrically connecting a control pin of the connector to the controller; and upon receiving the device signal, keeping electrically connecting the control pin to the controller.

15. The signal switching method for a connector supporting multiple connection standards of claim 14, further comprising:

when the device signal is not received, switching the control pin to be electrically connected to the processor.

16. The signal switching method for a connector supporting multiple connection standards of claim 11, further comprising:

outputting a first voltage to a power pin of the connector;
when the device signal is not received, keeping providing the first voltage to the power pin; and
upon receiving the device signal, switching to provide a second voltage to the power pin, wherein the second voltage is higher than the first voltage.

17. The signal switching method for a connector supporting multiple connection standards of claim 16, further comprising:

when the second voltage is provided to the power pin, upon detecting that the hot-plug signal has disappeared from the detection pin, restoring electrical connection of the at least one signal pin to the controller, stopping supplying power to the power pin, and discharging the power pin; and
after a predetermined period of the discharging, stopping the discharging and restoring supply of the first voltage to the power pin.

18. The signal switching method for a connector supporting multiple connection standards of claim 11, wherein the step of electrically connecting the at least one signal pin to the first interface of the processor or the controller according to the device signal comprises:

identifying the device signal;
when the device signal is first content, keeping electrically connecting the at least one signal pin to the controller; and
when the device signal is second content, electrically connecting the at least one signal pin to the first interface of the processor.

19. The signal switching method for a connector supporting multiple connection standards of claim 11, wherein the controller comprises a first interface and a second interface of different connection standards, and the step of electrically connecting the at least one signal pin to the first interface of the processor or the controller according to the device signal comprises:

identifying the device signal;
when the device signal is first content, keeping electrically connecting the at least one signal pin to the first interface of the controller;
when the device signal is second content, switching at least one signal pin to be electrically connected to the first interface of the processor; and
when the device signal is third content, switching the at least one signal pin to be electrically connected to the second interface of the controller.

20. A power supply method for an electronic device with a connector supporting multiple connection standards, comprising:

providing a first voltage to a power pin of the connector;
monitoring a detection pin of the connector;
upon detecting a hot-plug signal occurring at the detection pin, issuing a confirmation command via at least one signal pin of the connector to request a reply of a device signal;
when the device signal is not received, keeping providing the first voltage to the power pin; and
upon receiving the device signal, switching to provide a second voltage to the power pin, wherein the second voltage is higher than the first voltage.

* * * * *